United States Patent Office 2,732,966
Patented Jan. 31, 1956

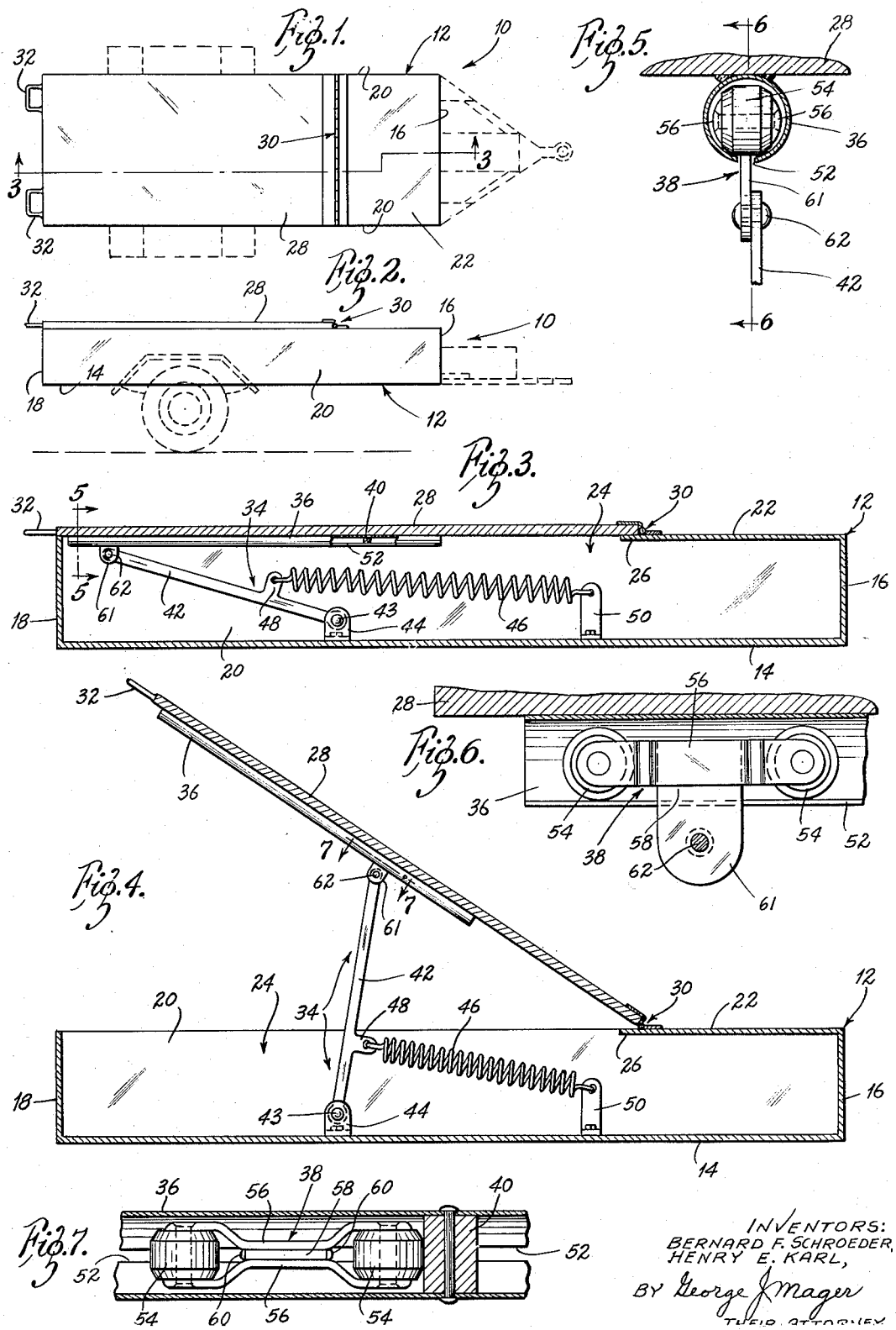

2,732,966
DOOR OPERATING MECHANISM

Bernard F. Schroeder, Manchester, and Henry E. Karl, Valley Park, Mo.

Application June 24, 1953, Serial No. 363,752

2 Claims. (Cl. 217—60)

The present invention relates generally to a novel door operating mechanism designed primarily, though not exclusively, for incorporation in a trailer of the type which may be hitched to the rear end of an automotive vehicle.

More particularly, the present invention relates to novel mechanism adapted to facilitate opening and closing operations of a normally horizontally disposed cover member or door for a trailer body, and adapted to automatically maintain said door in desired elevated or open disposition for loading the trailer body, and for unloading the same.

The type of trailer body herein contemplated comprises a rectangular storage compartment mounted on wheels, and having a bottom wall, front and rear walls, side walls, a partial top wall, and a pivotally mounted lid or door which combines with said partial top wall to normally cover the upper end of the compartment. The partial top wall extends rearwardly a relatively short distance from the front wall, and the front edge of the door has a hinged connection with the rear marginal edge portion of said top wall. The rear edge portion of said door is provided with a handle or handles, whereby said door may be manually swung upwardly about its pivotal or hinged connection to open disposition for access to the interior of the compartment, the door returning to closed position by gravity.

The trailer body structure thus far described is a conventional one and well known, being of cast iron, steel or other metallic material, in consequence of which the weight of the door has heretofore presented serious problems. In other words, not only has considerable strength been requisite to elevate the door, but the temporary maintenance thereof in such disposition has been a hazardous task.

Thus, it has been customary to manipulate a prop or brace into position beneath the elevated angularly disposed door between it and the bottom wall of the compartment with one hand, while straining against weight and gravity with the other. Assuming that a prop had been successfully manipulated into position, the danger of personal injury has nevertheless been ever present, as should be evident. For example, in the event the prop were nudged in the process of depositing or removing articles, personal injury would frequently result.

The primary object of the instant invention is to provide a novel yet simple mechanism designed not only to facilitate door opening and closing operations, but also to minimize danger of the personal injury factor incident thereto, and to compartment loading and unloading operations.

To this end, the invention provides an operating mechanism including a length of tubular track welded or otherwise rigidly secured to the underside of the door; a roller assembly reciprocable within said track and having a depending plate projecting through and beyond a longitudinal slot formed in the lowermost portion of said track; an abutment element for limiting the movements of the roller assembly in one direction; a link the upper end of which is pivotally connected to the depending plate of said roller assembly, and the lower end of which is similarly connected to a bracket affixed to the bottom wall of the trailer body; and a relatively heavy coil tension spring having one end thereof anchored to a portion of said link, and the opposite end thereof anchored to an upstanding bracket rigidly affixed to said bottom wall forwardly of the first-named bracket.

A more comprehensive understanding of the invention, its advantages and mode of operation, may be had from the detailed description thereof to follow with reference to the accompanying sheet of drawings, wherein the preferred embodiment is portrayed in association with an exemplary conventional trailer unit.

In said drawings:

Figure 1 is a top plan view of a typical conventional trailer having a swingable top cover or door with which the present invention is associated;

Figure 2 is a side elevational view thereof;

Figure 3 is a longitudinal sectional view on an enlarged scale taken substantially along the line 3—3 of Figure 1, and illustrating the operating mechanism of our invention in the normal or door-closed disposition thereof;

Figure 4 is a similar view illustrating the elevated or door-opened disposition of said mechanism;

Figure 5 is a further enlarged vertical sectional view taken on the line 5—5 of Figure 3;

Figure 6 is a vertical sectional view taken substantially along the line 6—6 of Figure 5; and Figure 7 is a sectional top plan view taken along the line 7—7 of Figure 4, the scale of the view corresponding to that of Figures 5 and 6.

With particular reference to Figures 1 and 2, numeral 10 designates generally a conventional trailer suitably mounted on wheels, and provided with means at its forward end for hitching it to an automotive vehicle as is understood.

The body of the illustrated trailer is designated in its entirety by the numeral 12, and as more clearly seen in Figures 3 and 4, includes a bottom wall 14, front and rear walls 16 and 18 respectively, side walls 20, and a partial top wall 22. It is noted that in the interest of clarity, the body is portrayed as an integral structure, it being of course understood that in actual manufacture, the named components thereof may be welded or otherwise secured together so as to provide an enclosure 24, usually referred to as a storage compartment.

The access opening of said compartment, which opening is defined by the upper marginal edges of the side walls 20, the upper marginal edge of the rear wall 18, and the rear marginal edge 26 of the partial top wall 22, is normally closed by a cover or door 28. The forward end of said door has a pivotal mounting 30 on top wall 22 adjacent the marginal edge 26 thereof, a piano type hinge being illustrated. Projecting from the rear end of said door is a pair of handles 32, by means of which said door has heretofore been manually swingable about its pivotal or hinged mounting from closed to open position, the door returning from any open disposition thereof to closed position under the influence of gravity, as is understood.

As previously explained, covers or doors of the character under consideration are relatively heavy, so that considerable strength had been required to elevate the door, and great care had to be exercised in propping the elevated door so as to avoid the ever present personal injury factor incident to placement and removal of articles from compartment 24. And as also previously noted, the present invention is designed to provide a simple mechanism for effecting door manipulations with ease, and for simultaneously minimizing the heretofore personal injury factor incident thereto.

The door operating mechanism of this invention is generally designated by the numeral 34, and is preferably disposed along the longitudinal centerline of the trailer body 12. Said mechanism includes a tubular track 36, welded as shown in Figure 5, or otherwise rigidly secured to the underside of the door 28; a roller assembly 38 reciprocably mounted in said track; an abutment or stop element 40 for limiting the movements of said roller assembly in a forward direction; a link 42 the lower end of which is pivotally mounted, as at 43, in a bracket 44 which is rigidly secured to the compartment bottom wall 14; a relatively heavy tension spring 46; a laterally projecting arm 48 on the link 42 for anchoring one end of spring 46; and a bracket 50 rigidly secured to said compartment bottom wall in forwardly spaced relation to bracket 44 for anchoring the other end of said spring.

The tubular track 36 is provided in its lowermost region with a longitudinal slot 52 coextensive therewith, and the abutment element 40 may be rigidly secured in place by a rivet as shown in Figure 7, by welding, or otherwise. The disposition of the abutment element 40 is such that when the door 28 is swung to the open position thereof exhibited in Figure 4, the force exerted by the tension spring 46 will bias the link 42 forwardly about its pivot 43 until the roller carriage 38 engages said abutment.

The construction of the roller carriage or assembly 38 is clearly illustrated in Figures 5 through 7. It includes a pair of spaced rollers 54 provided with ball bearings (not shown), and joined by two side bars 56 of the configuration shown. It is noted that the roller assembly 38 thus far described is commercially available, and that the present invention makes no claim thereto per se.

In accordance with the concepts of this invention however, the upper end portion of a plate 58 is welded as at 60, or otherwise secured to and between the side bars 56 as seen in Figure 7. The lower end portion 61 of plate 58 extends through and projects below the slot 52, where it has a pivotal connection 62 with the upper extremity of the link 42.

Preferably but not necessarily, the rollers 54 of assembly 38 are of a diameter to provide a slight clearance between their peripheries and the tubular track 36, whereby to minimize friction. Thus in the Figures 5 and 6 closed position of the door, the clearance obtains between the rollers and the uppermost region of the track. Obviously, when the door is raised, the clearance will obtain between the rollers and the lowermost region of the track. It is also noted that the depending portion 61 of plate 58 serves to maintain the roller assembly in proper alignment for smooth operation.

Operation

Although it is believed that the manner in which the mechanism operates should be apparent from the foregoing description and an inspection of the drawings, a brief explanation will now be given. It is to be noted that the spring 46 is installed in a pre-tensioned or extended condition, and that the abutment 40 is so positioned that with the door elevated as in Figure 4, the link 42 is forwardly inclined. Obviously with this arrangement, the force exerted by spring 46 will maintain the roller assembly 38 against the abutment element 40 as demonstrated in Figure 7, wherefore the link 42 serves to support the door 28 in the open position thereof illustrated. It will be remembered however that the door 28 is heavy, so that should it now be desired to close the door, a slight downward pull on the handles 32 will transmit to the link 42 via the roller assembly 38 and pivotal connection 62, a rearwardly directed force sufficient to extend the spring 46. Consequently the upper end of link 42 is swung rearwardly about its lower end pivotal connection 43 until the door 28 comes to rest by gravity on the upper edges of the side and rear end walls of the compartment 24.

It is to be observed that during the entire movement of the door 28 from open to closed position, the spring 46 plays an important role, as does the roller assembly 38 which moves smoothly rearwardly in the tubular track 36 until said door is closed. Said spring stabilizes the door, and prevents rapid descent thereof as should be evident.

To raise the door 28 from the closed disposition exhibited in Figure 2 to the open disposition thereof exhibited in Figure 4 is an almost effortless operation. The additional tension existent in spring 46 with the door closed, though not sufficient to overcome the weight of the door, nevertheless does bias said door toward open position. Consequently, a slight upward push exerted manually against the handles 32, is all that is required to swing the door to open disposition.

In contemplation of the preceding description and of the drawings, it should be manifest that the invention provides a novel and simple mechanism for the attainment of its objectives.

The illustrated disposition of the mechanism 34 is substantially along the longitudinal centerline of the trailer. Manifestly however, should it be desirable to have the central region of compartment 24 clear, twin mechanisms 34 may be employed, one adjacent each of the side walls 20.

What we claim is:

1. In combination: a trailer compartment including a bottom wall; a swingably mounted cover door for the compartment; a tubular track rigidly secured to the underside of the swingably mounted cover door along the longitudinal centerline thereof; a longitudinal slot in the lowermost region of said track and coextensive therewith; a roller assembly reciprocably mounted in the track; an abutment element for limiting the reciprocal movements of said assembly in a forward direction; a plate rigidly secured at its upper end to the roller assembly, and having a depending portion extending through and below said slot; a rearward bracket rigidly secured to the bottom wall of said compartment; a link having a pivotal connection at its upper end with the depending portion of said plate, and at its lower end with said bracket; a laterally projecting arm on the link intermediate the upper and lower end pivotal connections thereof; a forward bracket rigidly secured to the bottom wall of said compartment; and a pre-tensioned coil spring anchored at its rear end to the arm on said link, and at its forward end to the forward bracket aforesaid.

2. The combination with a trailer storage compartment including a bottom wall, front, rear, and side walls, of a swingably mounted normally horizontally disposed cover door for the compartment, and mechanism to facilitate opening and closing operations of said door and to releasably maintain the door in open position, said mechanism comprising: a tubular track having a slot in the lowermost region extending from end to end thereof rigidly secured to the underside of said door along the longitudinal centerline thereof; a roller assembly reciprocably mounted in the track; a depending plate rigid with said assembly projecting downwardly through said slot; a first bracket member rigidly mounted on said bottom wall of the storage compartment; a link having a pivotal connection at its upper end with the depending plate of the roller assembly and at its lower end with said first bracket member; a second bracket member rigidly mounted on said bottom wall of the storage compartment in forwardly spaced relationship relatively to said first bracket member; a forwardly projecting arm on said link intermediate the aforesaid upper and lower end pivotal connections thereof; a relatively heavy coil tension spring anchored at its forward end to said second bracket member and at its rearward end to said link arm, said spring being originally anchored in pre-energized condition; and an abutment element mounted in the forward end portion of said tubular track to arrest the forward travel of the roller assembly, when with the door in elevated position, the tension spring biases the link aforesaid forwardly about its pivotal connection with said first bracket member.

References Cited in the file of this patent

UNITED STATES PATENTS

| | | |
|---|---|---|
| 674,678 | Geran | May 21, 1901 |
| 933,070 | Gleason | Sept. 7, 1909 |
| 969,150 | Andersen | Sept. 6, 1910 |
| 1,247,687 | Just | Nov. 27, 1917 |
| 1,549,705 | Antonio | Aug. 11, 1925 |
| 1,975,701 | Poos | Oct. 2, 1934 |
| 2,151,335 | Rush | Mar. 21, 1939 |
| 2,168,661 | Anderson et al. | Aug. 8, 1939 |
| 2,538,434 | Svendsen | Jan. 16, 1951 |